(12) United States Patent
Albertson

(10) Patent No.: US 9,074,572 B2
(45) Date of Patent: Jul. 7, 2015

(54) ENGINE IDLING CONTROL SYSTEM FOR HYBRID VEHICLE

(75) Inventor: William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 2170 days.

(21) Appl. No.: 12/128,180

(22) Filed: May 28, 2008

(65) Prior Publication Data

US 2009/0299549 A1    Dec. 3, 2009

(51) Int. Cl.
| | |
|---|---|
| G05D 1/00 | (2006.01) |
| G05D 3/00 | (2006.01) |
| F02N 11/08 | (2006.01) |
| B60W 10/06 | (2006.01) |
| B60W 30/18 | (2012.01) |
| G08G 1/0967 | (2006.01) |
| B60K 6/485 | (2007.10) |
| B60W 20/00 | (2006.01) |

(52) U.S. Cl.
CPC ............. *F02N 11/0837* (2013.01); *B60K 6/485* (2013.01); *B60W 10/06* (2013.01); *B60W 20/00* (2013.01); *B60W 30/18054* (2013.01); *B60W 2550/22* (2013.01); *F02N 2200/125* (2013.01); *F02N 2300/306* (2013.01); *G08G 1/096725* (2013.01); *G08G 1/096783* (2013.01); *Y02T 10/6226* (2013.01); *Y02T 10/48* (2013.01)

(58) Field of Classification Search
CPC ..................... B60R 25/04; G07C 2009/00547
USPC .............. 701/1, 22, 36, 70, 112, 117, 119, 2; 123/3, 4
See application file for complete search history.

(56) References Cited

U.S. PATENT DOCUMENTS

| | | | | |
|---|---|---|---|---|
| 4,878,050 | A * | 10/1989 | Kelley | 340/12.54 |
| 6,054,932 | A * | 4/2000 | Gartner et al. | 340/815.65 |
| 6,629,515 | B1 * | 10/2003 | Yamamoto et al. | 123/179.4 |
| 7,333,012 | B1 * | 2/2008 | Nguyen | 340/539.1 |
| 7,831,369 | B2 * | 11/2010 | Naik et al. | 701/96 |
| 2003/0197385 | A1 * | 10/2003 | Onoyama et al. | 290/40 R |
| 2004/0029677 | A1 * | 2/2004 | Mori et al. | 477/3 |
| 2005/0143898 | A1 * | 6/2005 | Kaneko et al. | 701/103 |
| 2010/0030434 | A1 * | 2/2010 | Okabe et al. | 701/48 |

FOREIGN PATENT DOCUMENTS

DE    10347683 A1 *  5/2004

* cited by examiner

*Primary Examiner* — Behrang Badii
*Assistant Examiner* — Daniel L Greene

(57) ABSTRACT

An engine idling control system includes a receiver module and a timing module. The receiver module receives a signal indicative of a traffic light status. The timing module communicates with an engine and the receiver module and selectively starts and stops the engine based on the signal.

6 Claims, 3 Drawing Sheets

ENGINE IDLING CONTROL SYSTEM FOR HYBRID VEHICLE

FIELD

The present disclosure relates to hybrid vehicles, and more particularly to engine idling control systems for hybrid vehicles.

BACKGROUND

The statements in this section merely provide background information related to the present disclosure and may not constitute prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hybrid electric vehicle may use both an internal combustion engine and an electric motor to provide torque to maximize fuel economy. To start an engine of a hybrid vehicle, a motor generator may function as an electric motor and draw electrical energy from a battery pack to drive the engine crankshaft. When the engine is running, the motor generator may function as a generator and be driven by the engine to recharge the battery pack.

Typically, a hybrid vehicle may shut the engine off when the hybrid vehicle stops (e.g., for a traffic light) to reduce fuel consumption. The hybrid vehicle may only stop for a very short period of time and the fuel saving may be limited. For example, the traffic light may turn from red to green after a short period. In these situations, shutting the engine off may achieve limited fuel saving and a time delay in restarting the engines.

SUMMARY

Accordingly, an engine idling control system may include a receiver module and a timing module. The receiver module receives a signal indicative of a traffic light status. The timing module communicates with an engine and the receiver module and selectively starts and stops the engine based on the signal.

A method of controlling an engine during idling includes receiving a signal indicating a status of a traffic light, and selectively starting and stopping the engine based on the signal.

In other features, the signal indicates a traffic light change from red to green after a predetermined period of time. The timing module starts the engine when the engine is off or keeps the engine running when the engine is running upon receipt of the signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
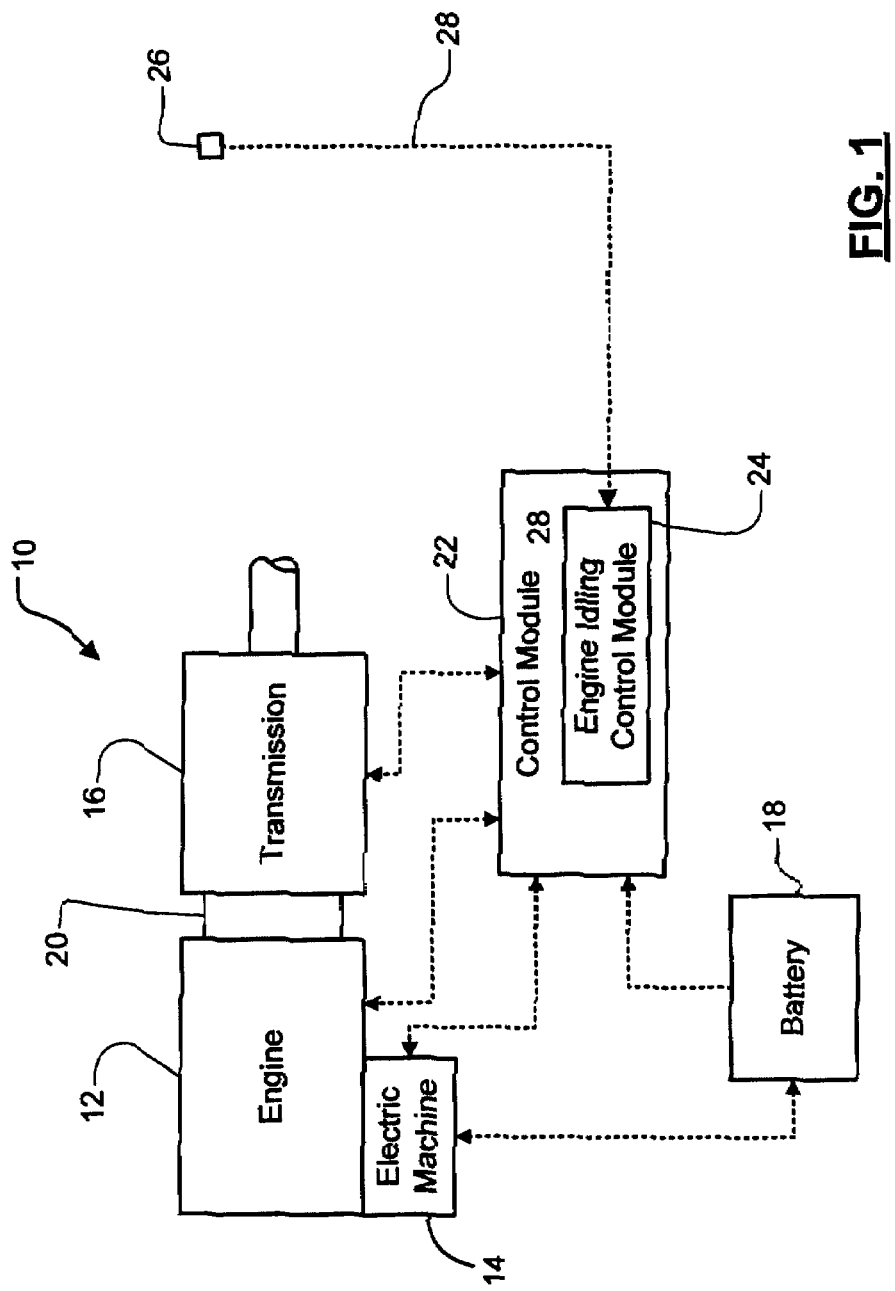
FIG. 1 is a schematic block diagram of a hybrid vehicle according to the teachings of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

An engine idling control system in accordance with the teachings of the present disclosure includes a timing module. The timing module may selectively start and stop the engine in response to a signal from a traffic light indicating an imminent light change from red to green. Therefore, the engine is ready for an upcoming acceleration mode before a driver becomes aware of the traffic light change from red to green.

Referring now to FIG. 1, an exemplary hybrid vehicle 10 includes an engine 12 and an electric machine 14 that selectively drive a transmission 16. The electric machine 14 supplements the engine 12 to produce drive torque to drive the transmission 16. In this manner, fuel efficiency is increased and emissions are reduced. In one mode, the engine 12 drives the electric machine 14 to generate power to recharge a battery 18. In another mode, the electric machine 14 drives the transmission 16 using energy from the battery 18.

The engine 12 and the electric machine 14 can be coupled via a belt-alternator-starter (BAS) system (not shown) that includes a belt and pulleys. Alternatively, the engine 12 and the electric machine 14 can be coupled via a flywheel-alternator-starter (FAS) system (not shown), wherein the electric machine 14 is operably disposed between the engine 12 and the transmission 16. It is anticipated that other systems can be implemented to couple the engine 12 and the electric machine 14 including, but not limited to, a chain or gear system that is implemented between the electric machine 14 and a crankshaft (not shown).

The transmission 16 can include, but is not limited to, a continuously variable transmission (CVT), a manual transmission, an automatic transmission and an automated manual transmission (AMT). Drive torque is transferred from the engine 12 to the transmission 16 through a coupling device 20. The coupling device 20 can include, but is not limited to, a friction clutch or a torque converter depending upon the type of transmission implemented. In the case of a CVT, the coupling device 20 includes a torque converter and a torque converter clutch (TCC). The transmission 16 multiplies the drive torque through one of a plurality of gear ratios to drive a vehicle driveline (not shown).

A control module 22 regulates operation of the vehicle 10. The control module 22 includes an engine idling control module 24. The engine idling control module 24 controls stop and start of the engine 12 when the engine 12 is idling. The engine idling control module 24 communicates with a traffic light 26 and may control the engine 12 in response to a first signal 28 from the traffic light 26. The first signal 28 may be a light signal from the traffic light 26 or a particular high frequency signal from a light emitting diode (LED) at a predetermined time interval. The first signal 28 may indicate an imminent light change from red to green. In other words, the first signal 28 may indicate that the traffic light 26 is going to change from red to green after a predetermined period of time. Upon receipt of the first signal 28, the engine idling control module 24 may control the engine 12 accordingly before a driver becomes aware of the traffic light change and makes any start requests.

Figure 2:
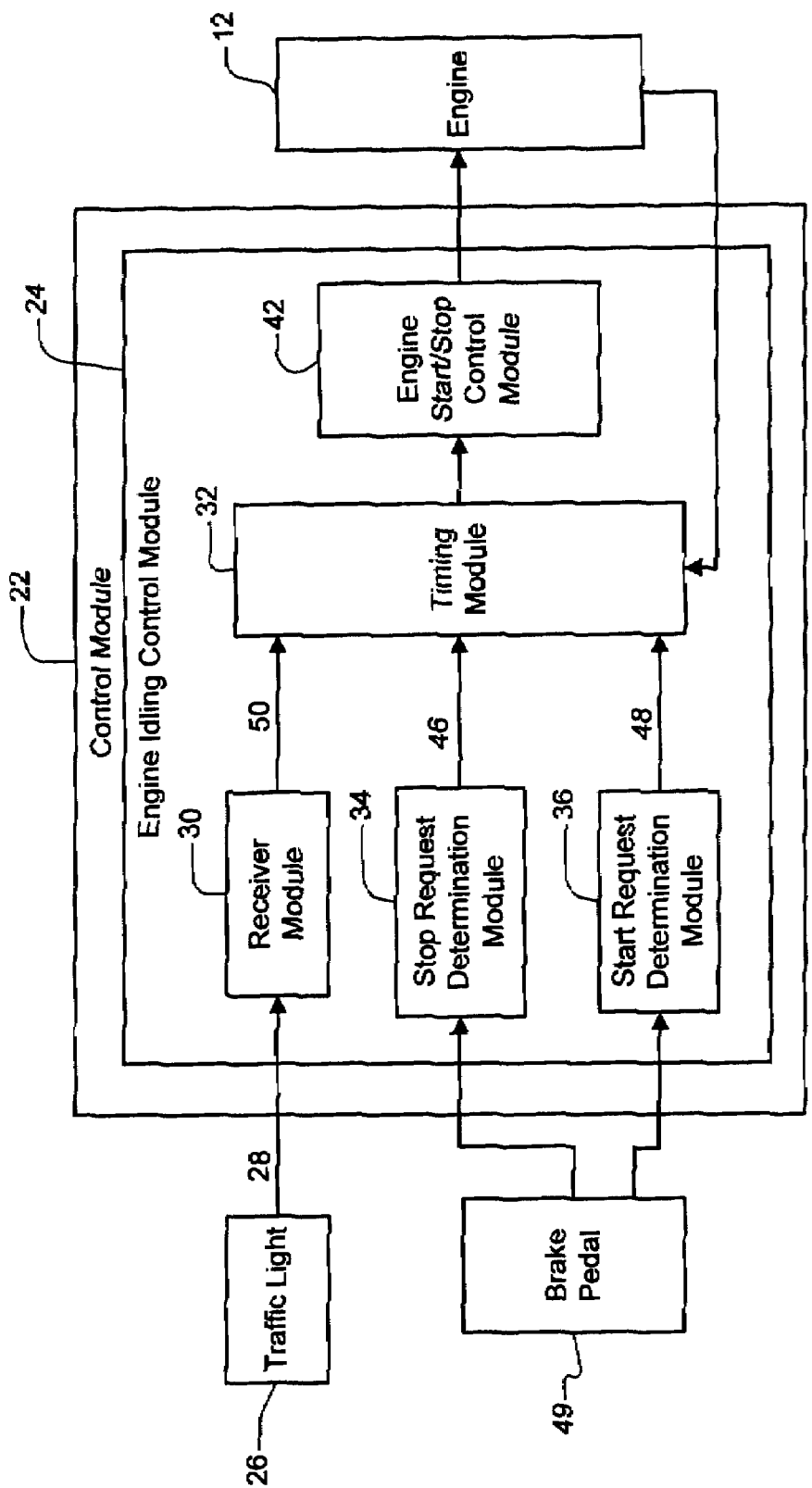
FIG. 2 is a schematic block diagram of a control module for a hybrid vehicle according to the teachings of the present disclosure.

Referring to FIG. 2, the engine idling control module 24 includes a receiver module 30, a timing module 32, a stop request determination module 34, a start request determination module 36, and an engine start/stop control module 42.

The timing module 32 communicates with the receiver module 30, the stop request determination module 34, the start request determination module 36, and the engine start/stop control module 42. When the stop request determination module 34 receives a vehicle stop request (for example only, from a brake pedal 49) and determines that an engine stop condition has been satisfied, the stop request determination module 34 generates and sends an engine stop request 46 to the timing module 32. In normal conditions, the timing module 32 may command the engine start/stop control module 42 to stop the engine 12. An engine stop request 46 may be generated, for example only, when the stop request determination module 34 determines that the vehicle speed has reduced to a threshold value or zero.

When the start request determination module 36 receives an engine start request (for example only, by releasing the brake pedal 49) and determines that an engine start condition has been satisfied, the start request determination module 36 may generate and send an engine start request 48 to the timing module 32. In normal conditions, upon receipt of the engine start request 48, the timing module 32 may command the engine start/stop control module 42 to start the engine 12.

When the receiver module 30 receives the first signal 28 indicating an imminent traffic light change, the receiver module 30 sends a second signal 50 to the timing module 32. The timing module 32 may selectively start and stop the engine 12 based on the status of the engine 12. The status of the engine 12 may be determined by an engine speed sensor (not shown) at the engine 12. The status of the engine 12 may include information about whether the engine 12 is running or shut off.

When the vehicle 10 stops before a red light, the engine 12 may be shut off to avoid fuel consumption. When the traffic light 26 is soon to turn from red to green, the traffic light 26 may generate a first signal 28 indicating the status of the traffic light (i.e., a traffic light change from red to green after a predetermined period of time). Upon receipt of the first signal 28, the receiver module 30 generates and sends the second signal 50 to the timing module 32. The timing module 32 may command the engine start/stop control module 42 to start the engine 12 and the transmission oil pump (auxiliary electric pump) or move the transmission from neutral. The second signal 50 from the receiver module 30 may function as an alternative start request besides the start request from the start request determination module 36 under normal conditions (e.g., without traffic light 26). Therefore, the engine 12 and associated apparatuses are prepared and ready for an upcoming acceleration mode before the traffic light 26 changes from red to green. The timing module 32 thus improves the vehicle's transition from stop to acceleration.

When the vehicle 10 approaches a traffic light 26 that is soon to turn from red to green, the traffic light 26 may generate the first signal 28 indicating the status of the traffic light.

Upon receipt of the first signal 28, the receiver module 30 may generate and send the second signal 50 to the timing module 32. The second signal 50 may override an upcoming stop request 46 from the stop request determination module 34 (due to, for example, zero speed of the vehicle). Therefore, the timing module 32 may command the engine start/stop control module 42 to continue operating the engine 12. The engine 12 may remain in the operating condition, ready for an acceleration mode.

Figure 3:
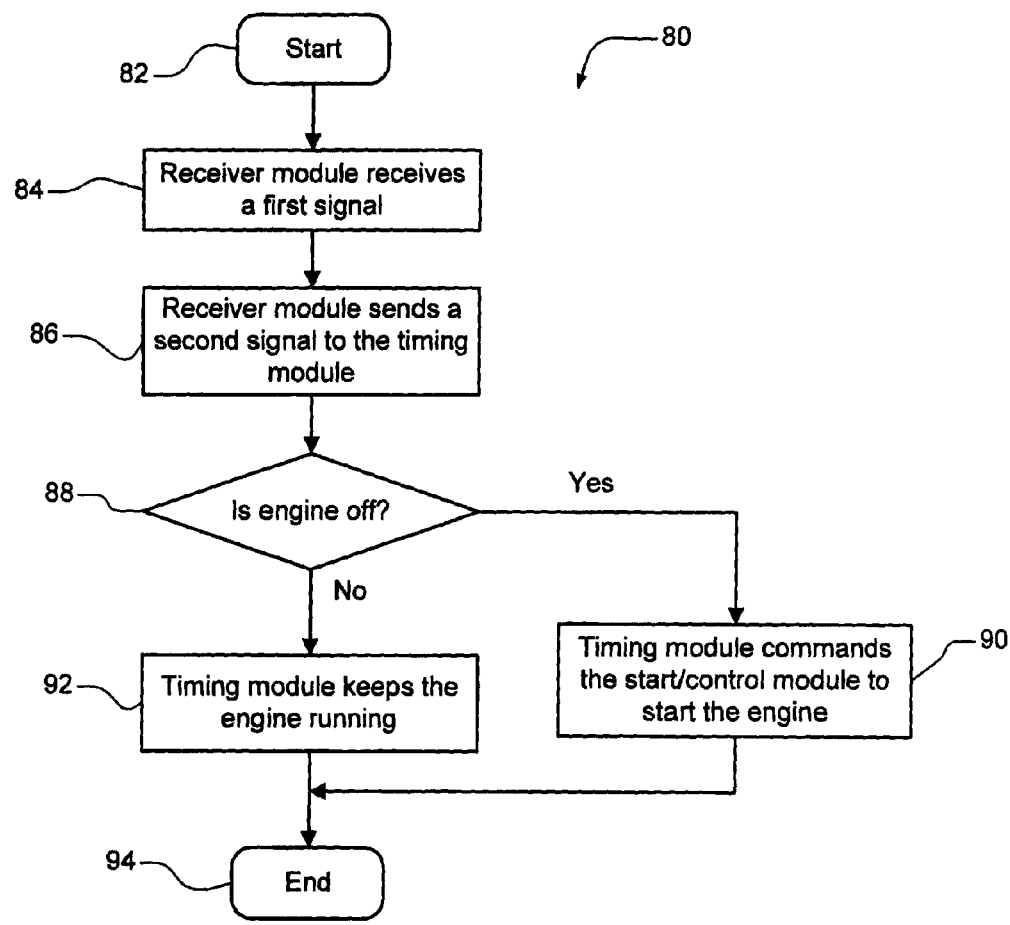
FIG. 3 is a flow diagram of a method of controlling an engine during engine idling according to the teachings of the present disclosure.

Referring to FIG. 3, a method 80 of controlling an engine during idling starts at step 82. When the receiver module 30 receives a first signal 28 indicating an imminent traffic light change from red to green in step 84, the receiver module 30 generates and sends a second signal 50 to the timing module 32 in step 86. The timing module 32 may selectively start and stop the engine 12 based on the status of the engine 12. The timing module 32 may determine the engine operating status according to the engine speed sensor in step 88. If the timing module 32 determines that the engine 12 is off, the timing module 32 may command the engine start/control module 42 to start the engine 12 in step 90. If the timing module 32 determines that the engine 12 is not off in step 88, the timing module 32 may keep the engine 12 running in step 92. Any upcoming stop request 46 from the stop request determination module 34 may be disregarded until the receiver module 30 stops receiving the first signal 28. As a result, the engine 12 remains running, ready for an upcoming acceleration request. The method 80 ends at step 94.

With the timing module 32 in accordance with the teachings of the present disclosure, the engine 12 can be started before the driver becomes aware of the traffic light change and makes a start request. Moreover, when the vehicle approaches a red light that is soon to turn green, the timing module 32 may keep the engine 12 running despite an upcoming stop request. As such, the engine 12 is ready for an upcoming acceleration. The timing module 32 in accordance with the teachings of the present disclosure may augment any on-board acceleration anticipation methods.

While not shown in the drawings, it is appreciated and understood that the receiver module 30 may receive signals from apparatuses or systems other than the traffic light (for example only, from Global Positioning Systems) that may provide an indication of an imminent light change. Further, an on-board device that communicates with the receiver module 30 may be provided to alert the drivers of the upcoming light change so that the driver can be prepared for the upcoming acceleration.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine during idling comprising:
   receiving an optical signal generated by a traffic light;
   determining a status of the traffic light based on the optical signal; and
   selectively starting and stopping the engine based on the traffic light status, a speed of a vehicle, and depression of a brake pedal, wherein the traffic light status overrides the vehicle speed and brake pedal depression for selectively starting and stopping the engine.

2. The method of claim 1, wherein the traffic light status is either a first status indicating that the vehicle can proceed or a second status indicating that the vehicle should stop.

3. The method of claim 2, further comprising starting the engine when the brake pedal depression is less than a predetermined amount.

4. The method of claim 3, further comprising keeping the engine stopped when the brake pedal depression is less than the predetermined amount and the traffic light status is the second status.

5. The method of claim 1, further comprising stopping the engine when the brake pedal depression is greater than or equal to a predetermined amount and the vehicle speed is less than or equal to a predetermined threshold.

6. The method of claim 5, further comprising keeping the engine running when the brake pedal depression is greater than or equal to the predetermined amount, the vehicle speed is less than or equal to the predetermined threshold, and the traffic light status is the first status.

* * * * *